United States Patent
Anitescu et al.

(10) Patent No.: US 9,725,664 B2
(45) Date of Patent: *Aug. 8, 2017

(54) INTEGRATED MULTISTAGE SUPERCRITICAL TECHNOLOGY TO PRODUCE HIGH QUALITY VEGETABLE OILS AND BIOFUELS

(71) Applicants: Gheorghe Anitescu, Syracuse, NY (US); Lawrence L. Tavlarides, Fayetteville, NY (US)

(72) Inventors: Gheorghe Anitescu, Syracuse, NY (US); Lawrence L. Tavlarides, Fayetteville, NY (US)

(73) Assignee: Syracuse University, Syracuse, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/225,615

(22) Filed: Mar. 26, 2014

(65) Prior Publication Data

US 2014/0196359 A1  Jul. 17, 2014

Related U.S. Application Data

(62) Division of application No. 12/032,391, filed on Feb. 15, 2008, now Pat. No. 8,690,967.
(Continued)

(51) Int. Cl.
*C10L 1/24* (2006.01)
*C10L 5/00* (2006.01)
(Continued)

(52) U.S. Cl.
CPC .................. *C10L 1/02* (2013.01); *C10L 1/026* (2013.01); *C11C 3/00* (2013.01);
(Continued)

(58) Field of Classification Search
CPC .... C10G 2300/1011; C10L 1/02; C10L 1/026; C11C 3/00; Y02E 50/13; Y02P 30/20
(Continued)

(56) References Cited

U.S. PATENT DOCUMENTS 3,977,377 A  8/1976  Reid
4,020,814 A  5/1977  Hewitt et al.
(Continued)

OTHER PUBLICATIONS

International Search Report Form PCT/ISA/220 International Application No. PCT/US2008/54141, Dated Jul. 28, 2008.

*Primary Examiner* — Latosha Hines
(74) *Attorney, Agent, or Firm* — Bond Schoeneck and King PLLC; David Nocilly; George McGuire

(57) ABSTRACT

A power generation system, which includes a source of a seed oil, a source of alcohol, and a reactor in communication with the source of seed oil and the source of alcohol. The reactor produces a biofuel product. The system has a power source that operates on a biofuel energy source to produce heated exhaust and is in communication with the reactor to utilize a portion of the biofuel product as its biofuel energy source. The system has a heat transfer mechanism that transfers heat from the exhaust manifold to the reactor. The power source also converts mechanical power into electrical power. Also disclosed is a system that involves extraction of oil from an oilseed product. A method of extracting oil from an oilseed product, a method of making a transesterified seed oil, and a method of making a biofuel are also disclosed, as are products obtained thereby.

8 Claims, 11 Drawing Sheets

Related U.S. Application Data

(60) Provisional application No. 60/890,065, filed on Feb. 15, 2007.

(51) Int. Cl.
*C10L 1/02* (2006.01)
*C11C 3/00* (2006.01)

(52) U.S. Cl.
CPC ....... *C10G 2300/1011* (2013.01); *Y02E 50/13* (2013.01); *Y02P 30/20* (2015.11)

(58) Field of Classification Search
USPC .................................................. 44/388, 639
See application file for complete search history.

(56) References Cited

U.S. PATENT DOCUMENTS

| | | | |
|---|---|---|---|
| 6,887,283 B1 * | 5/2005 | Ginosar | C10L 1/19 44/388 |
| 2003/0083514 A1 * | 5/2003 | Boocock | C07C 67/03 554/174 |
| 2005/0081435 A1 | 4/2005 | Lastella | |
| 2005/0279095 A1 | 12/2005 | Goldman | |
| 2006/0094890 A1 * | 5/2006 | Sharma | C11C 3/003 554/174 |
| 2006/0107586 A1 * | 5/2006 | Tavlarides | C10L 1/026 44/628 |
| 2007/0001462 A1 * | 1/2007 | McNeil | F02M 25/12 290/52 |
| 2007/0033865 A1 | 2/2007 | Caprotti et al. | |
| 2008/0260902 A1 * | 10/2008 | Van Houten | A23D 9/00 426/18 |

\* cited by examiner (26°C)

(100 °C)

(200 °C)

(350°C)

(375 °C)

(420 °C)

(26°C)

(100 °C)

(150 °C)

(200°C)

(250 °C)

(325 °C)

(350°C)

(375 °C)

(400 °C)

INTEGRATED MULTISTAGE SUPERCRITICAL TECHNOLOGY TO PRODUCE HIGH QUALITY VEGETABLE OILS AND BIOFUELS

CROSS-REFERENCE TO RELATED APPLICATIONS

This application is a divisional of U.S. patent application Ser. No. 12/032,391, filed on Feb. 15, 2008, which claims priority to U.S. Provisional Application No. 60/890,065, filed on Feb. 15, 2007.

BACKGROUND OF THE INVENTION

1. Field of the Invention

The present invention relates to systems and methods for producing high quality vegetable oils and biofuels.

2. Description of the Related Art

Biodiesel, a mixture of fatty acid methyl/ethyl esters ("FAME"), derived from plant/animal triglycerides through transesterification with an alcohol, is a fuel that is under a great deal of consideration. It has been assessed that biodiesel yields 93% more energy than that invested in its production and, relative to fossil fuels, greenhouse gases are reduced 41% by the biodiesel production and combustion while less air pollutants are released per net energy gain (Hill et al., *Proc. Natl. Acad. Sci. USA* 103:11206-11210 (2006)). While worldwide triglyceride sources are diverse, over 90% of biodiesel in the United States is made from soybean oil ("SBO") (Collins, K. Statement of Keith Collins, chief economist, U.S. Department of Agriculture before the U.S. Senate Committee on Appropriations Subcommittee on Agriculture, Rural Development, and Related Agencies. Aug. 26, 2006). By increasing the production of soybeans there could be a positive feedback on agriculture through higher quantity of soybean meals and implicitly more meat for food and more triglyceride supply for biodiesel production.

Although these benefits are very attractive, the current biodiesel final cost is prohibitively high without governmental subsidies. Much of the actual technological complexity, involving multiple steps on triglyceride pretreatment and biodiesel separation/purification, originates from contaminants in the feedstock (e.g., water and free fatty acids ("FFA")) or impurities in the final product (e.g., glycerol, methanol and soaps) (Van Gerpen, *Fuel Process. Technol.* 86:1097-1107 (2005)). Compared with these conventional catalytic methods, a relatively new supercritical method was found capable to reduce transesterification time from hours to minutes through a continuous process which requires no feed pretreatment for triglyceride with high FFA/water content (Kusdiana et al., *Bioresour. Technol.* 91:289-295 (2004)).

However, many factors have been found to affect the FAME yield in the supercritical method, including transesterification temperature, pressure and residence time, alcohol to triglyceride ratios, feedstock composition, as well as mixing and solubility parameters. Among these factors, the most important are the ratio of alcohol to triglyceride and the transesterification temperature. The former was found to increase the FAME yield when it was far beyond the stoichiometric molar ratio of 3:1 (up to 64:1), but it was associated with increased cost of pumping, separating, and recycling of the excess alcohol. The latter led to shorter residence time but higher energy consumption and the risk of FAME decomposition.

To understand these difficulties, a thorough survey was performed on increasingly reported information regarding the supercritical methods of biodiesel production (Kusdiana et al., *Bioresour. Technol.* 91:289-295 (2004); Han et al., *Process Biochem.* 40:3148-3151 (2005); Iijima et al, ASAE/CSAE Annual International Meeting, Ottawa, Ontario, Canada, Aug. 1-4, 2004, Paper no. 046073; Saka et al., *Fuel* 80:225-231 (2001); Kusdiana et al., *Fuel* 80:693-698 (2001); Bunyakiat et al., *Energy & Fuels* 20:812-817 (2006); Busto et al., *Energy & Fuels* 20:2642-2647 (2006); Warabi et al., *Bioresour. Technol.* 91:283-287 (2004); Demirbas, *Energy Convers. Manage.* 43:2349-2356 (2002); Kusdiana et al., *J. Chem. Eng. Jpn.* 34:383-387 (2001); He et al., *Fuel* 86:442-447 (2007); Diasakou et al., *Fuel* 77:1297-1302 (1998); Cao et al., *Fuel* 40:347-351 (2005); Madras et al., *Fuel* 83:2029-2033 (2004); Varma et al., *Ind. Eng. Chem. Res.* 46:1-6 (2007); Demirbas, *Energy Convers. Manage.* 44:2093-2109 (2003); Han et al., *Process Biochem.* 40:3148-3151 (2005); Tijima et al., ASAE/CSAE Annual International Meeting, Ottawa, Ontario, Canada, Aug. 1-4, 2004, Paper No. 046073). In one example, refined SBO was treated with supercritical methanol and $CO_2$ as a co-solvent at 280° C. and 143 bar in a batch reactor for 10 minutes (Han et al., *Process Biochem.* 40:3148-3151 (2005)). Under these conditions, 98.5% conversion of oil to biodiesel was reported. The other key process variables were molar ratios of methanol to oil (24:1) and $CO_2$ to methanol (1:10). The reaction products were settled for 60 minutes for glycerol separation and then methanol was evaporated from both phases at 70° C. Although $CO_2$ lowered the pressure and temperature ("P-T") conditions of transesterification, the tradeoff between the process time and transesterification temperature was not well balanced. Moreover, the excess alcohol precluded obtaining usable biodiesel directly from the reactor.

In another example, canola oil and supercritical methanol were preheated at 270° C. and the mixture was then treated in a capillary reactor up to 500° C. and 400 bar for 4 minutes (Iijima et al., ASAE/CSAE Annual International Meeting, Ottawa, Ontario, Canada, Aug. 1-4, 2004, Paper No. 046073). The range of methanol to oil ratio was from 11:1 to 45:1 on molar basis. Thermal decomposition of glycerol was reported for temperatures beyond 400° C. At these high P-T values, the unsaturated high-molecular FAME also decomposed to $C_6$-$C_{10}$ smaller molecular esters. The optimum reaction temperature was considered 450° C. The excess methanol, up to 60%, was removed from the reaction products by using a rotary evaporator. In this case, too, the excess alcohol precluded obtaining usable biodiesel directly from the reactor.

Information on mutual solubility of the reaction components, often an overlooked issue, is essential for the production design and process operation. The reactants (triglycerides and alcohol) and the products (FAME and glycerol) are partially mutually soluble in the transesterification process. The alcohol is soluble in both FAME and glycerol, but is not significantly soluble in oil. With an increase in the mass fraction of FAME, the alcohol solubility in the triglyceride-FAME phase increases. The transesterification reaction is carried out in the alcohol phase and, consequently, the reaction advance depends on oil solubility in this phase. For example, when FAME content increases to 70%, the triglyceride-methanol-FAME mixture becomes a homogeneous phase (Zhou et al., *J. Chem. Eng. Data* 51:1130-1135 (2006)). Glycerol has a low solubility in both oil and FAME but high affinity for alcohol.

Kinetic studies on triglyceride-alcohol systems revealed an unusual behavior of the reaction rate constant with increasing temperature and pressure. To explain this phenomenon, the phase equilibria of the pseudo binary system sunflower oil ("SFO")-methanol were measured at different temperatures between 200 and 230° C. and pressures between 10 and 56 bar (Glisic et al., *J. Serb. Chem. Soc.* 72:13-27 (2007)). The reported data indicated a strong influence of the phase equilibrium on the reaction kinetics. High-pressure phase equilibria have also been calculated for the ternary system of $C_{54}$ triglyceride-ethanol-$CO_2$, at 40-80° C. and 60-120 bar (Geana et al., *Supercrit. Fluids* 8:107-118 (1995)). The role of $CO_2$ as cosolvent in increasing the mutual solubility of oil and ethanol was revealed.

Also, fluid transport properties play an important role in the transesterification reactions. In an example, the influence of the axial dispersion on the performance of tubular reactors during non-catalytic supercritical transesterification of triglycerides has been studied (Busto et al., *Energy & Fuels* 20:2642-2647 (2006)). It was found that supercritical transesterification reactors must be operated at axial Peclet numbers higher than 1000 in order to limit back mixing effects and achieve batch-like conversions at short residence times. Otherwise, the authors concluded that high temperatures and high methanol to oil ratios were required for high conversions at lower Peclet numbers.

Overall, these reports present the major findings on theoretical and technical aspects of biodiesel production by supercritical methods. Given the high number of the process parameters affecting supercritical transesterification conversions, many of them being competitive, it is difficult to comprehensively and cohesively grasp their effects. Indeed, there are not even two reported sets of data with similar claimed optimum transesterification conditions (Table 1)

TABLE 1

Conditions and Yield for the Reported Noncatalytic Transesterification

| Oil/cosolvent | T (° C.) | P (bar) | MeOH/TG | τ (min) | B/C | Yield (%) | Ref. |
|---|---|---|---|---|---|---|---|
| Rapeseed | 350 | 450 | 42 | 4 | B | 95 | 1 |
| Soybean | 235 | 62 | 6-27 | 600 | B | 85 | 2 |
| Soybean/$CO_2$ * | 280 | 143 | 24 | 10 | B | 98 | 3 |
| Soybean/$C_3H_8$ ** | 280 | 128 | 24 | 10 | B | 98 | 4 |
| Canola | 420-450 | 400 | 11-45 | 4 | C | ~100 | 5 |
| Coconut and palm | 350 | 190 | 42 | 7 | C | 95-96 | 6 |
| Soybean | 310 | 350 | 40 | 25 | C | 77-96 | 7 |
| Sunflower | 350 | 200 | 40 | 40 | B | 96 | 8 |
| Castor and linseed | 350 | 200 | 40 | 40 | B | 98 | 9 |
| Soybean/$C_3H_8$ ** | 288 | 96 | 64 | 10 | B | 99 | 10 |
| Soybean | 285-290 | 100-110 | 10-12 | N/A | B | ~100 | 11 |
| Waste oil/$C_3H_8$ ** | 280 | 128 | 24 | 17 | C | 95 | 12 |
| Soybean/$CO_2$ * | 350-425 | 100-250 | 3-6 | 2-3 | C | ~100 | a |

* $CO_2$/MeOH = 0.1;
** $C_3H_8$/MeOH = 0.05;
[1] Saka et al., Fuel 80: 225-231 (2001); Kusdiana et al., Fuel 80: 693-698 (2001);
[2] Diasakou et al., Fuel 77: 1297-1302 (1998);
[3] Han et al., Process Biochem. 40: 3148-3151 (2005);
[4] Cao et al., Fuel 40: 347-351 (2005);
[5] Iijima et al., ASAE/CSAE Annual International Meeting, Ottawa, Ontario, Canada, Aug. 1-4, 2004, Paper No. 046073;
[6] Bunyakiat et al., Energy & Fuels 20: 812-817 (2006);
[7] He et al., Fuel 86: 442-447 (2007);
[8] Madras et al., Fuel 83: 2029-2033 (2004);
[9] Varma et al., Ind. Eng. Chem. Res. 46: 1-6 (2007);
[10] Hegel et al., Ind. Eng. Chem. Res. 46: 6360-6365 (2007);
[11] D'Ippolito et al., Energy & Fuels 21: 339-346 (2007);
[12] Kasteren et al., Resour., Conserv. Recycling 50: 442-458 (2007);
[a] present application, limited number of experiments were executed with this cosolvent as shown in Table 2, infra.

Also, technical and economic feasibility studies of creating an alternative to conventional biodiesel industry are scarce (D'Ippolito et al., Energy & Fuels 21:339-346 (2007); Kasteren et al., Resour. Conserv. Recycling 50:442-458 (2007)).

Two major issues on improving the efficiency of biodiesel production concern the oil-alcohol mixing and the separation/purification processes. While the former issue can be overcome by carrying out transesterification in supercritical states, the latter is more challenging. As biodiesel production has risen, the excessive supply of glycerol has glutted the market, sinking its price. The price of glycerol ($0.20-$0.50/lb) could drop further as biodiesel production increases (Rosner, New York Times, Aug. 8, 2007). It would be desirable, therefore, to identify process parameters that allow high yield while affording decomposition of glycerol (even with slight decomposition of FAME), which will overcome the problem of glycerol recovery in the costly separation/purification steps.

The present invention is directed to overcoming these and other limitations in the art.

BRIEF SUMMARY OF THE INVENTION

In accordance with the foregoing objects and advantages, the present invention provides. A first aspect of the present invention is directed to a power generation system. The system includes a source of seed oil, a source of alcohol, and a reactor in communication with the source of seed oil and the source of alcohol. The reactor is constructed in a manner that affords suitable mixing of the seed oil with the alcohol under conditions effective to transesterify the seed oil, thereby producing a biofuel product. The reactor has an outlet. Also included in the system is a power source that operates on a biofuel energy source to produce heated exhaust that is discharged via an exhaust manifold. The power source is in communication with the outlet of the reactor to utilize a portion of the biofuel product as its biofuel energy source. The system also includes a heat transfer mechanism that transfers heat from the exhaust manifold to the reactor. The power source also converts mechanical power into electrical power.

A second aspect of the present invention is directed to a biodiesel engine system. This system includes a source of seed oil, a source of alcohol, and a reactor in communication with the source of seed oil and the source of alcohol. The reactor is constructed in a manner that affords suitable mixing of the seed oil with the alcohol under conditions effective to transesterify the seed oil, thereby producing a biofuel product. The reactor has an outlet. Also included in the system is a biodiesel engine that operates on a biofuel energy source to produce power and heat. The biodiesel engine is in communication with the outlet of the reactor to utilize a portion of the biofuel product as its biofuel energy source. The system also includes a heat transfer mechanism that transfers heat from the biodiesel engine to the reactor and a collection reservoir that is in communication with the outlet of the reactor and receives a second portion of the biofuel product.

A third aspect of the present invention is directed to a system, which includes a source of an oilseed product, a source of a supercritical carbon dioxide, a source of alcohol, and an extractor in communication with the source of an oilseed product and the source of supercritical carbon dioxide. The extractor is constructed in a manner that affords suitable mixing of the oilseed product and the supercritical carbon dioxide under conditions effective to extract seed oil from the oilseed product. The extractor has an outlet. The system also includes a reactor in communication with the outlet of the extractor and the source of alcohol, the reactor being constructed in a manner that affords suitable mixing of the seed oil with the alcohol under conditions effective to transesterify the seed oil, thereby producing a biofuel product. The reactor has an outlet. Also included in the system is a power source that operates on a biofuel energy source to produce heat, where the power source is in communication with the outlet of the reactor to utilize a first portion of the biofuel product as its biofuel energy source. The system also includes at least one of (i) a heat transfer mechanism that transfers heat from the power source to the extractor, the reactor, or both the extractor and the reactor, and (ii) a collection reservoir that receives a second portion of the biofuel product.

A fourth aspect of the present invention is directed to a method of extracting oil from an oilseed product. This method involves contacting the oilseed product with supercritical carbon dioxide under conditions effective to extract oil from the oilseed product. The conditions include a temperature between about 80° C. and the roasting temperature of the oilseed product, and a pressure of at least 100 bar.

A fifth aspect of the present invention is directed to a method of making a transesterified seed oil. This method involves performing the method of extracting oil from an oilseed product as set forth in the fourth aspect of the present invention and reacting the extracted seed oil with a supercritical alcohol under conditions effective to transesterify the seed oil. The present invention is also directed to a transesterified seed oil made by this method.

A sixth aspect of the present invention is directed to a method of making a biofuel product. This method involves performing the method according to the fifth aspect of the present invention to form a transesterified seed oil product and removing the byproducts from the transesterified seed oil product to produce a refined biofuel product. The present invention is also directed to a refined biofuel product made by this method.

A seventh aspect of the present invention is directed to a method of making a biofuel product that includes: providing a vegetable oil; and reacting a vegetable oil with a supercritical alcohol under conditions effective to transesterify the vegetable oil and form a biofuel product substantially free of glycerol, and which does not require further separation of alcohol therefrom. The present invention is also directed to a biofuel product made by this method.

The overall goal of the present invention is to provide a simplified process for cost-effective, continuous and/or batch biodiesel production. Specific objectives were to determine optimal ranges of parameters for the transesterification reactions for high biodiesel yields. A supercritical fluid technology coupled with power cogeneration is expected to produce biodiesel fuels without the conventional complex separation/purification steps. In other words, a usable biofuel fuel is obtainable directly following transesterification. The core of the integrated system includes the transesterification of various triglyceride sources (i.e., vegetable oils and animal fats) with supercritical methanol/ethanol. Part of the reaction products can be combusted by a diesel engine or other power source integrated into the system, which, in turn, provides the power needed to pressurize the system and the heat of the exhaust gases for the transesterification process. Transesterification experiments have been conducted at 100-300 bar, 250-425° C., and 0.73-8.2 minute residence time with soybean/sunflower oils as triglycerides and supercritical methanol/ethanol at ratios of alcohol to oil from 3 (stoichiometric) to 24. Special emphasis is on reactant phase transitions from liquid to supercritical states. These transitions were monitored with a high-pressure, high-temperature view cell connected to the reactor outlet for the continuous transesterification experiments and also serving as a batch reactor. Under selected parameters, near complete oil conversion to biodiesel has been achieved (>98%) with the glycerol decomposition products included in the fuel.

Commercial biodiesel production by the methods of the present invention have processing costs estimated as low as $0.26/gal for a plant capacity of 5 million gal/year, significantly lower than the current processing costs of ~$0.51/gal of biodiesel produced by conventional catalytic methods. A retail cost of biodiesel produced by the proposed method is likely to be competitive with diesel fuel prices.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 3:
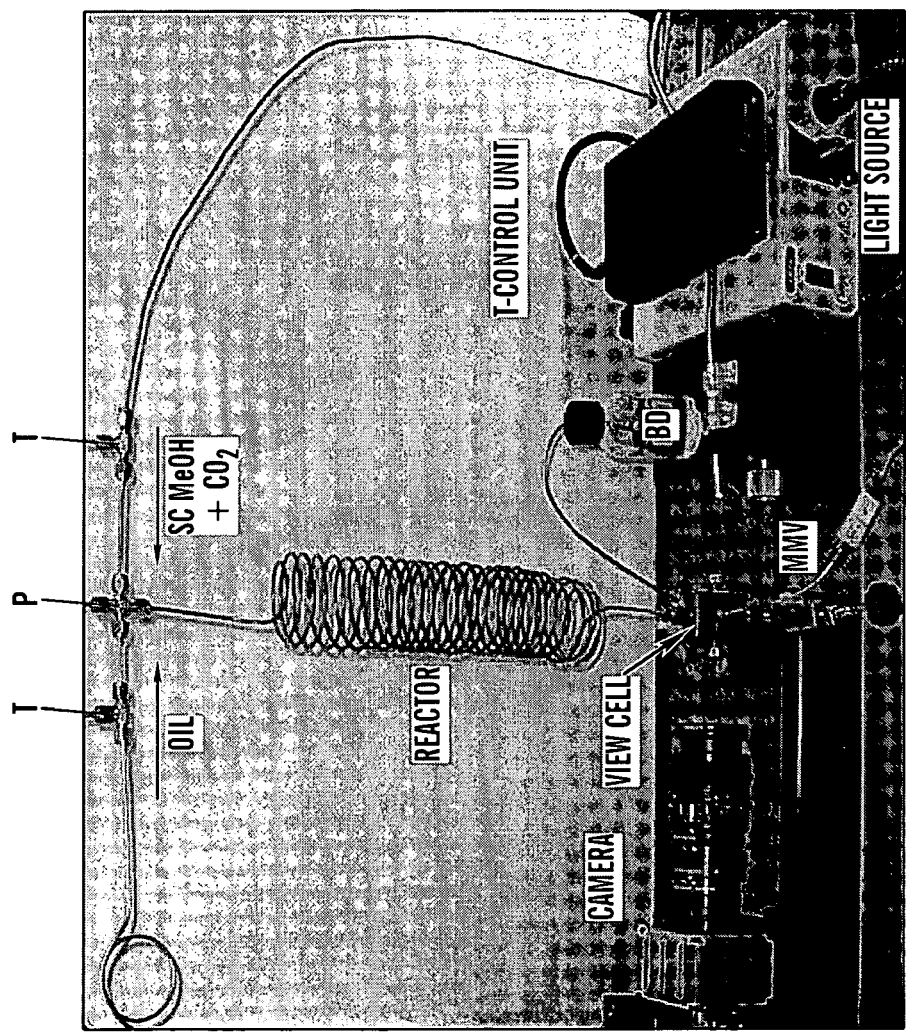

FIG. 3 is a photograph of a laboratory flow apparatus to study phase transitions and transesterification reactions. T designates a thermocouple; P designates a pressure indicator; MMV designates a micrometric valve.

Figure 4:
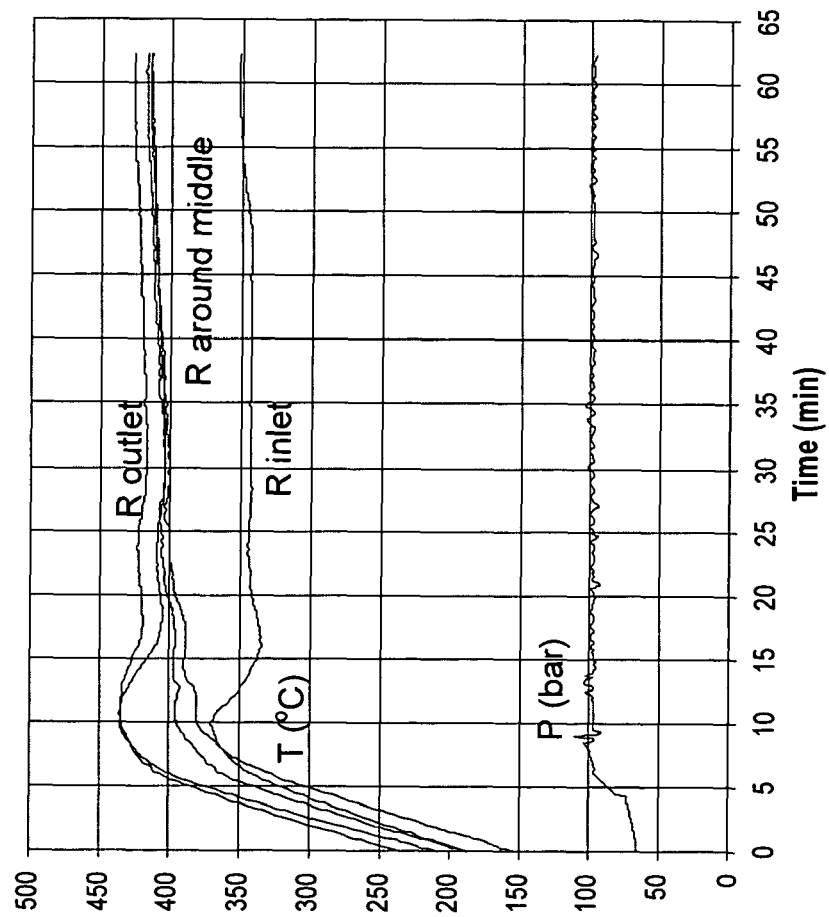

FIG. 4 is a graph showing typical P-T conditions for the transesterification reactions of soybean oil-methanol ("SBO-MeOH") (runs #17-21 in Table 2 were executed between 15 and 63 minutes of the total recorded time). The thermocouples were located at different positions along the reactor R as shown in the figure.

Figure 5A:
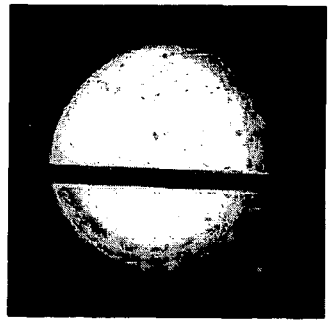
Figure 5B:
Figure 5C:
Figure 5D:
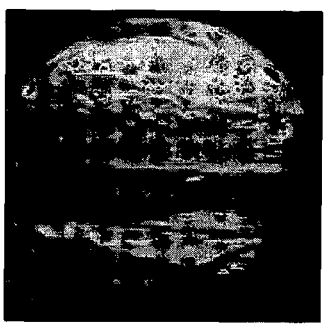
Figure 5E:
Figure 5F:
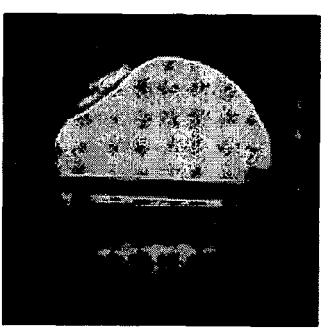
Figure 5G:
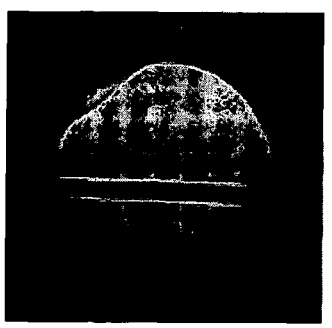
Figure 5H:
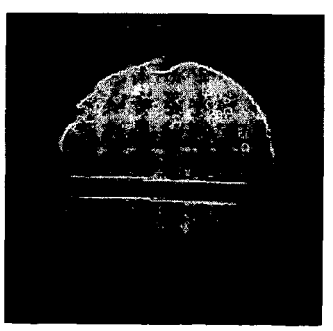
Figure 5I:
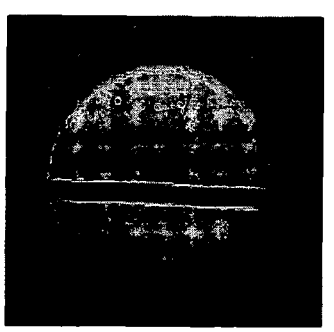

FIGS. 5A-I are images showing mixtures of SBO (2 mL/min)-Ethanol (0.4 mL/min) (EtOH:SBO molar ratio of 3.4) flowing through a view cell (V=~1 mL) at 400° C. and 200 bar. FIG. 5A is for supercritical EtOH only; FIGS. 5B-E are for unsteady states; Figures F-H are for transitions to supercritical states; and FIG. 5I is for a supercritical state. (The horizontal line in the middle of these images is a 0.2 mm thick wire inserted in the view cell streamline for focusing purposes.)

Figure 6A:
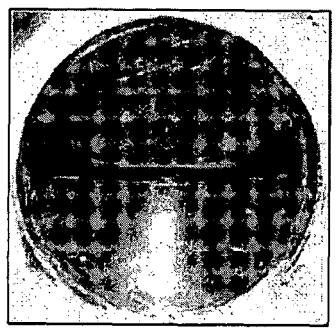
Figure 6B:
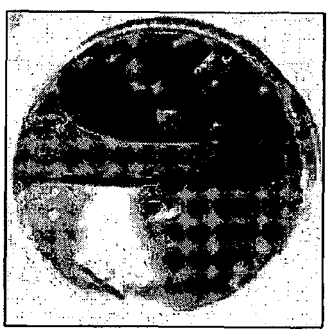
Figure 6C:
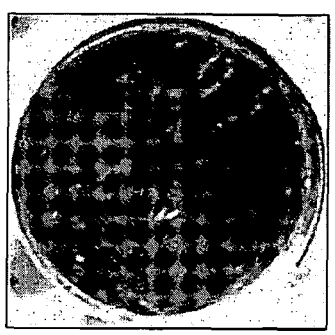
Figure 6D:
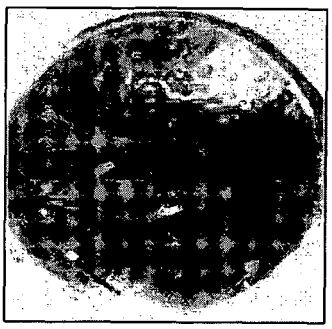
Figure 6E:
Figure 6F:
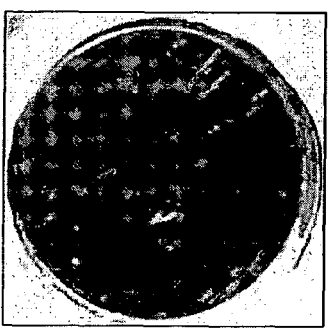
Figure 7A:
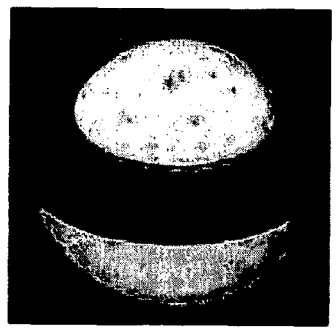
Figure 7B:
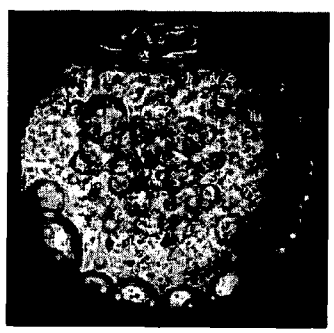
Figure 7C:
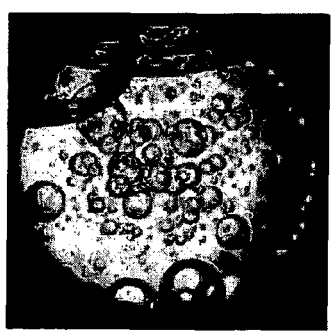
Figure 7D:
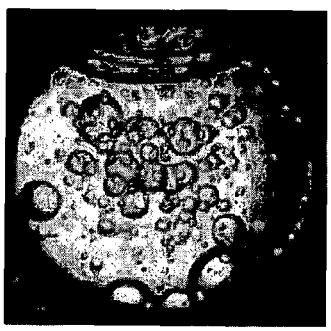
Figure 7E:
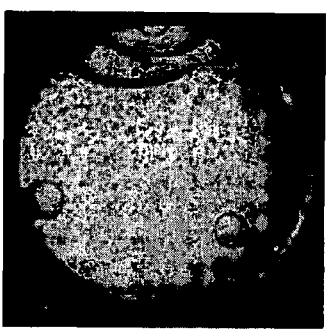
Figure 7F:
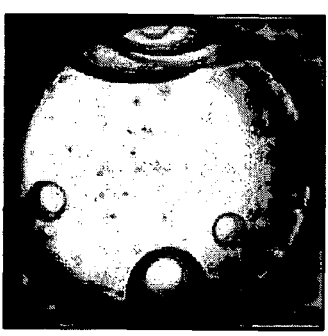
Figure 7G:
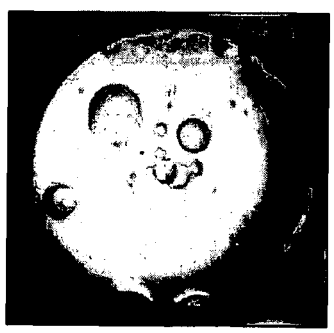
Figure 7H:
Figure 7I:
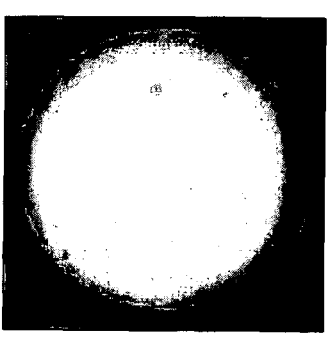

FIGS. 6A-F are selected images of phase transitions associated with batch transesterification reactions between SBO and methanol (3 mL each; 1:23 molar ratio), heated from ambient P-T conditions to 420° C. and 120 bar. The images go from SBO(L)-MeOH(L) (FIG. 6A), through SBO(L)-MeOH(L)-MeOH(V) (FIGS. 6B-C), SBO-BDF-MeOH(L-SC) (FIGS. 6D-E), and then BDF-MeOH(SC) (FIG. 6F). The volume of the view cell is 6 mL.

FIGS. 7A-I are images showing miscibility of a SBO-EtOH (1:16 molar ratio) mixture being heated from room temperature to 400° C. at 100 bar. The volume of the view cell is 1 mL.

Figure 8A:
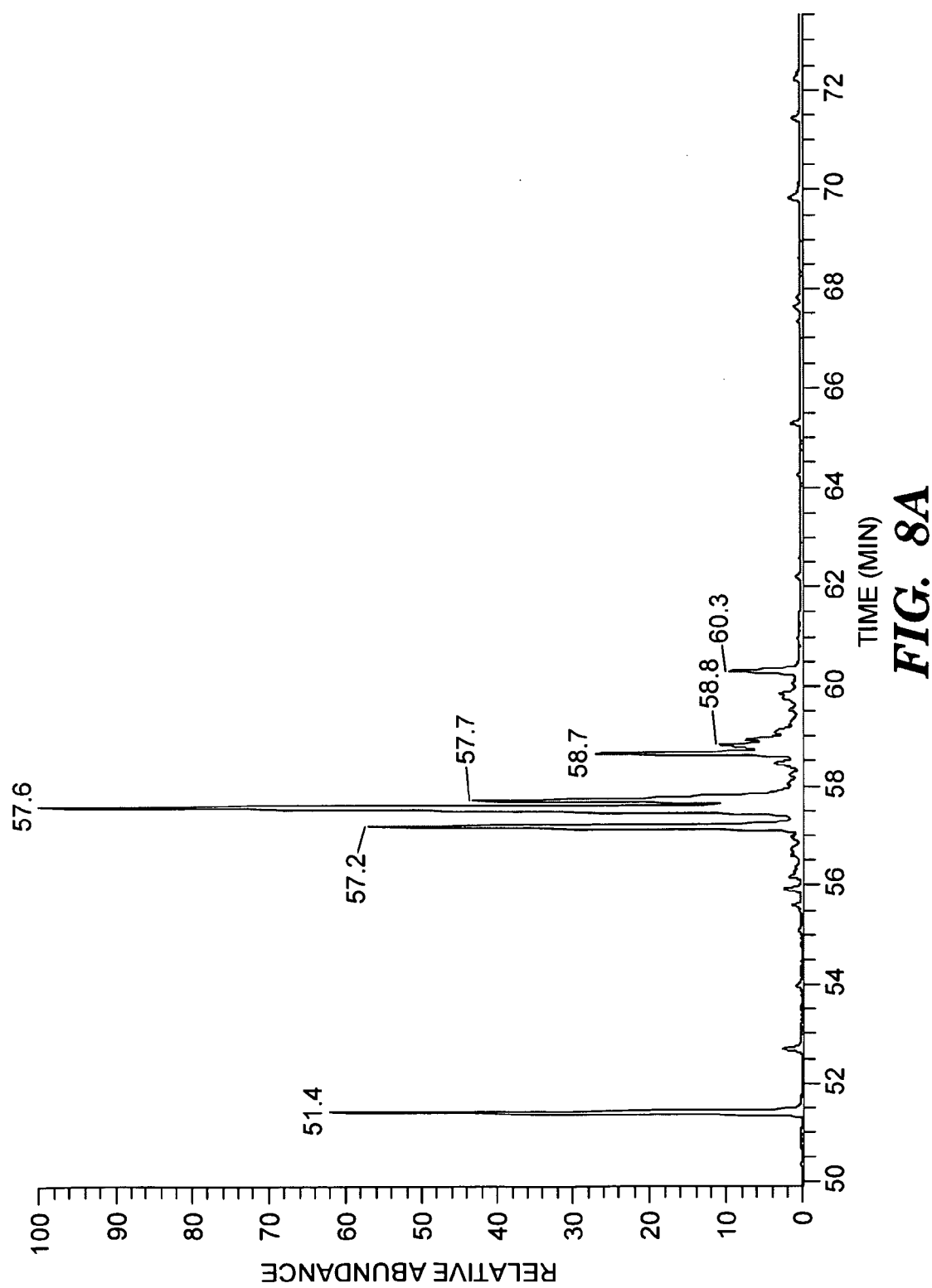
Figure 8B:
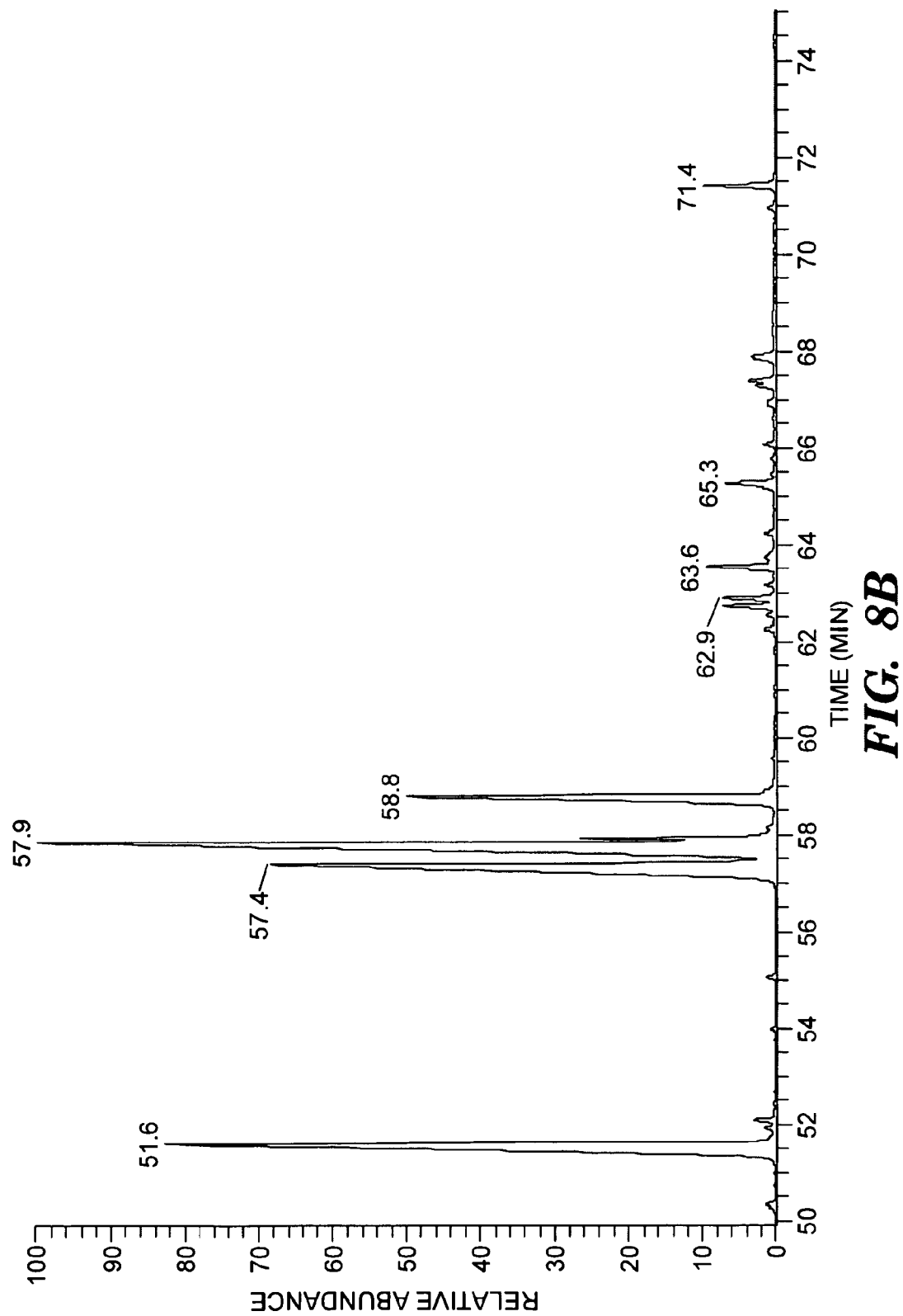
Figure 8C:
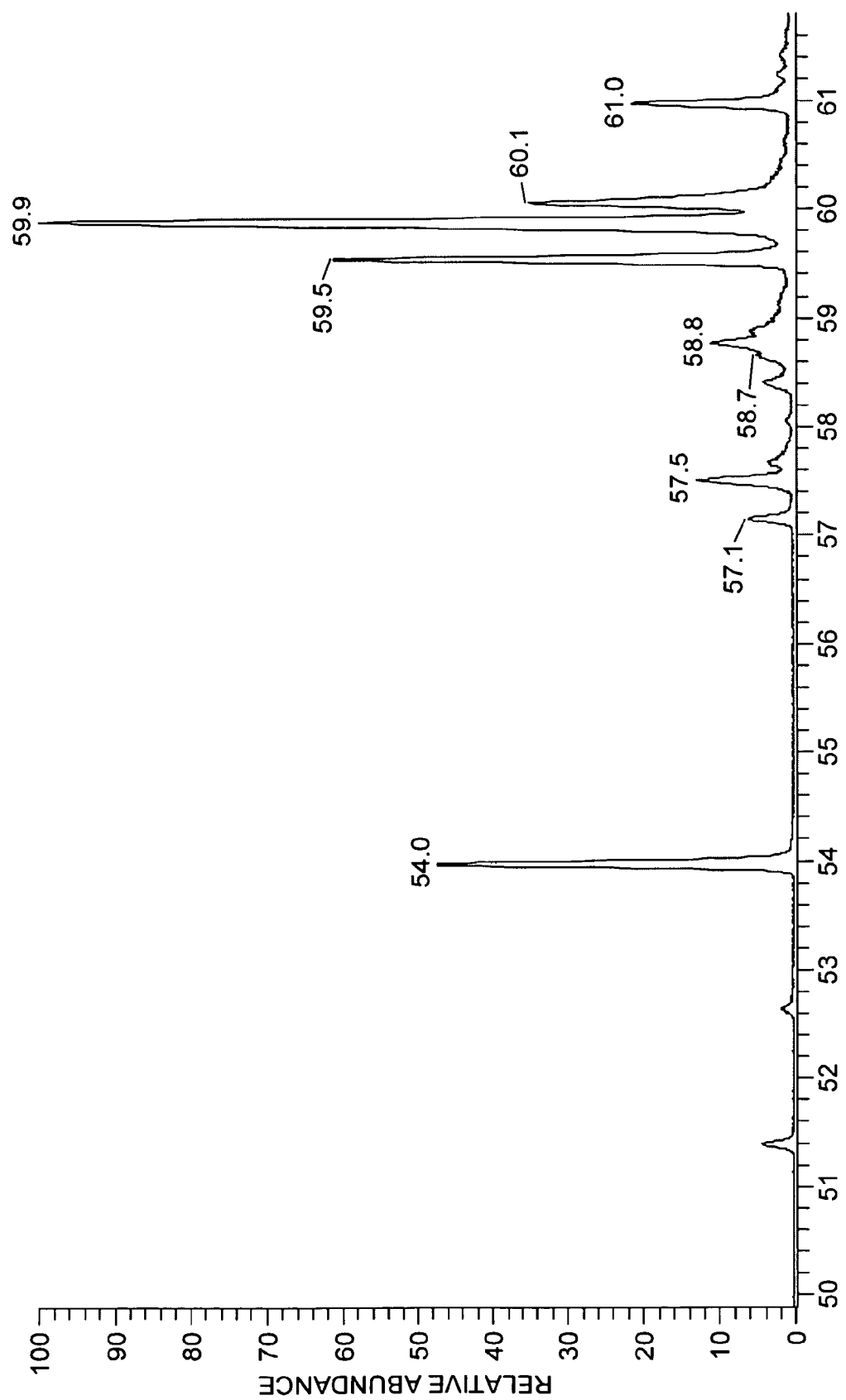
Figure 8D:
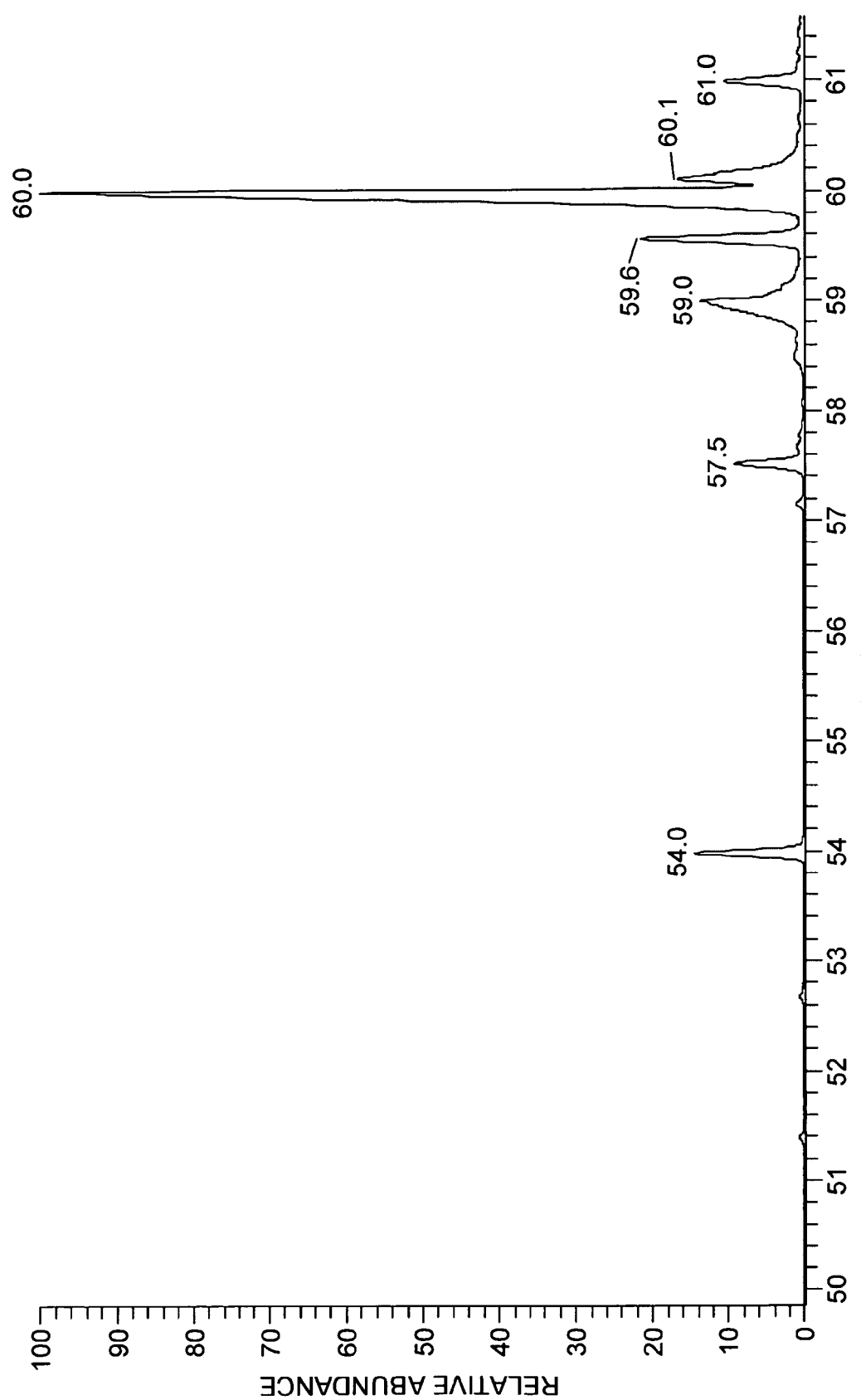

FIGS. 8A-D are chromatograms showing transesterification products of: SBO with methanol (from run 17/Table 2) (FIG. 8A); a commercial sample (FIG. 8B); SBO with ethanol (from run 8/Table 2) (FIG. 8C); and SFO with ethanol (from run 13/Table 2) (FIG. 8D). The main peaks are palmitic acid methyl ester (51.4 (FIG. 8A), 51.6 (FIG. 8B)), oleic acid methyl ester (57.6 (FIG. 8A), 57.9 (FIG. 8B)), linoleic acid methyl ester (57.2 (FIG. 8A), 57.4 (FIG. 8B)), linolenic acid methyl ester (57.7 (FIG. 8A), 57.9 (FIG. 8B)), stearic acid methyl ester (58.7 (FIG. 8A), 58.8 (FIG. 8B)), palmitic acid ethyl ester (54.0 (FIG. 8C and FIG. 8D)), oleic acid ethyl ester (59.9 (FIG. 8C), 60.0 (FIG. 8D)), linoleic acid ethyl ester (59.5 (FIG. 8C), 59.6 (FIG. 8D)), linolenic acid ethyl ester (60.1 (FIG. 8C and FIG. 8D)), and stearic acid ethyl ester (61.0 (FIG. 8C and FIG. 8D)).

DETAILED DESCRIPTION OF THE INVENTION

Referring now to the drawings, wherein like reference numerals refer to like parts throughout, there is seen in Figure The present invention relates to systems and methods that involve the supercritical transesterification of vegetable oil (e.g., seed oils) and optionally the supercritical extraction of oil from a seed oil product. In particular, the systems and methods employed herein are integrated for harnessing the biofuel product to generate heat and electricity that are recycled into the system and methods, while preferably recovering a portion of the biofuel product for subsequent usage (i.e., in a biodiesel engine associated with an automobile) and possibly even storage of electrical power (i.e., in a battery or other device).

The systems and methods of the present invention are particularly suitable for operation off a power grid, but they can be integrated into a power grid if desired.

Basically, the system includes a source of oil and a source of alcohol, which are the two reactants in the transesterification process of forming the biofuel product, a reactor in which the transesterification process occurs, and a power source that utilizes a portion of the biofuel product recovered from the reactor to generate heat and/or electricity, which can be harnessed in the transesterification process. In particular, a heat transfer mechanism allows for heat to be recovered from the hot biofuel product to warm the oil and alcohol prior to their introduction into the reactor. In addition, a heat transfer mechanism allows for heat to be recovered from the exhaust gases of the power source to heat the reactor. Finally, generated electrical power can be used to operate pumping and/or supplemental heating devices.

Any alcohol reactant suitable for transesterification can be employed, but the alcohol is preferably a lower alkyl alcohols, more preferably a straight-chain, lower alkyl alcohol. Excellent results have been achieved using methanol and ethanol, and these are especially preferred.

The alcohol can also include an inert co-solvent, which is useful for enhancing oil-alcohol miscibility. A preferred co-solvent is carbon dioxide. If used, the carbon dioxide is preferably not more than about 10 mol %, more preferably about 1 to about 5 mol %, most preferably about 3 to about 5 mol %.

Suitable oil reactants include those that are capable of transesterification to achieve a useful biofuel. The oil is preferably a vegetable oil selected from soybean oil, sunflower oil, safflower oil, rapeseed oil, peanut oil, and mixtures thereof, although other oils can be utilized. The oils useful in the present invention are typically those derived from an oilseed or oilseed product, which can be any product obtained following disruption of the oilseed itself. Oilseed products include those obtained following grinding or pulverizing the oilseed into flakes, chips, meal, flour, etc.

The combination of an alcohol with an oil in the transesterification reaction is at a molar ratio of at least about 3 parts alcohol to 1 part oil (3:1), preferably between about 3:1 to about 10:1, including about 4:1 to about 8:1. Excellent results have been achieved using ratios of between about 5:1 to about 6:1.

The system may also include a subsystem for supercritical $CO_2$ extraction of oil from an oilseed product. Basically, the subsystem is the source of oil, as described above. This subsystem includes a source of an oilseed product, a source of supercritical $CO_2$, an extraction vessel in which oil is removed from oilseed product by supercritical $CO_2$, and a flash tank in which the $CO_2$ and oil are separated. The $CO_2$ can be recycled from the flash tank for future extraction processes. As noted above, generated heat and electricity can be harnessed to operate pumps that transfer the materials and supplemental heating devices used to heat the $CO_2$ and/or oil.

Figure 1:
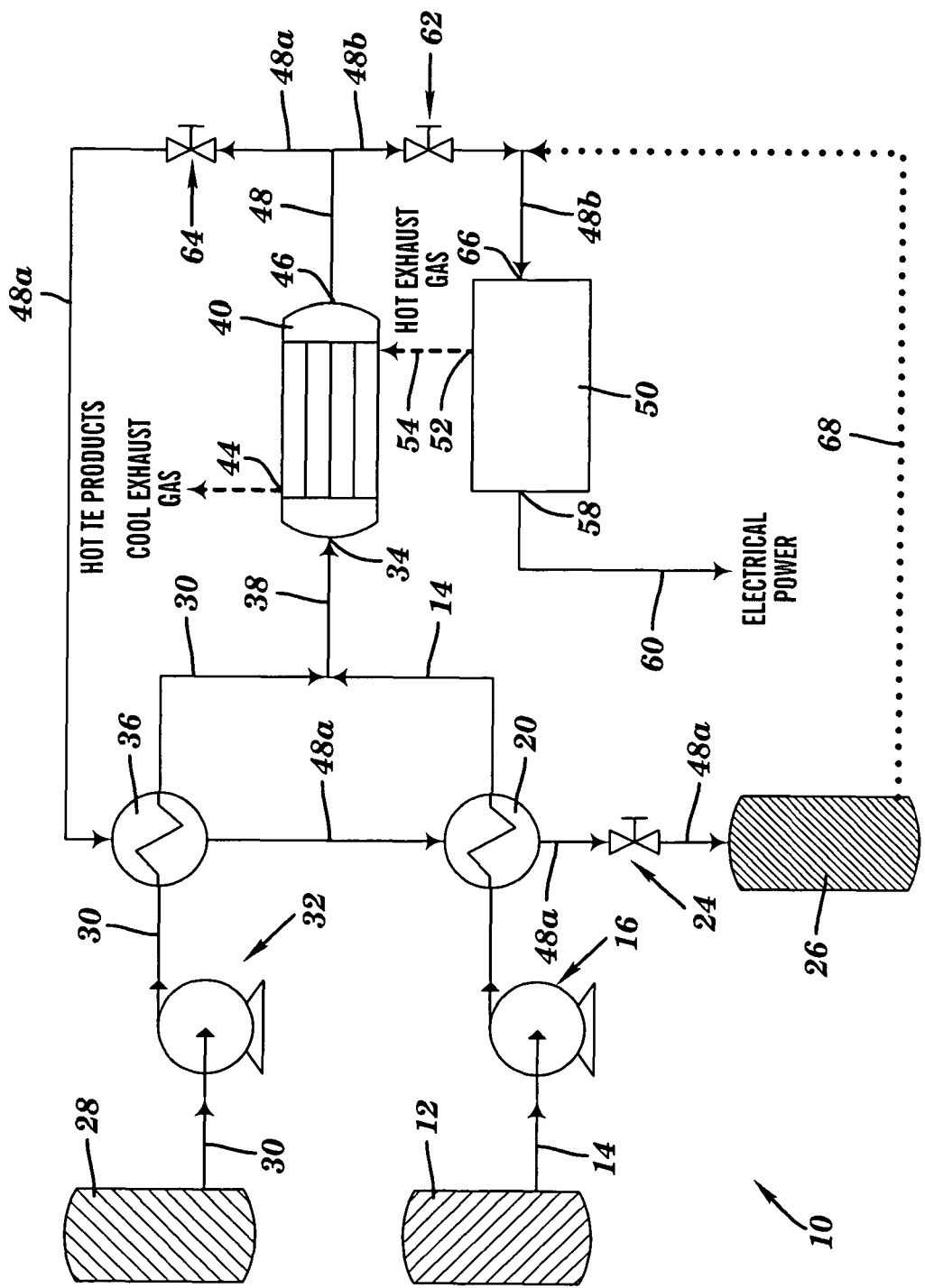
FIG. 1 is a schematic illustration of a system for the conversion of vegetable oil to biodiesel fuel according to one embodiment of the present invention.

Referring now to FIG. 1, power generation system 10 according to one embodiment of the invention is illustrated. The system 10 includes oil storage tank 12, alcohol storage tank 28, reactor 40, power source 50, and heat transfer mechanism 54.

Reactor 40 is in communication with oil storage tank 12 via connector 38 and connector 14. Reactor 40 is also in communication with alcohol storage tank 28 via connector 38 and connector 30. Connector 38 joins connectors 30 and 14, and allows for mixing of oil and alcohol prior to their introduction to reactor 40 via intake port 34. Connector 30 includes feed pump 32 and preheater 36. Connector 14 includes feed pump 16 and preheater 20.

The transesterified oil, now a biofuel product, is removed from reactor 40 via outlet 46 and connector 48. Connector 48 splits to form a first branch 48a and a second branch 48b. The first branch 48a connects via valve 64 with preheaters 36 and 20, and ultimately storage tank (or collection reservoir) 26. There is also a valve 24 in the first branch 48a, located between preheater 20 and storage tank 26. Preheaters 36 and 20 allow for heat exchange to occur between the hot transesterified biofuel product and the oil and alcohol being fed into reactor 40. The second branch 48b connects via valve 62 with power source 50 to deliver biofuel to the power source.

Power source 50 includes intake port 66, exhaust manifold 52, and electrical port 58. Heat transfer mechanism 54 is connected to exhaust manifold 52 and is coupled to the reactor 40, which allows heat transfer from the hot exhaust gas to the reactor. For example, the heat transfer mechanism can be a jacket (e.g., from a shell in tube reactor) or a separate coil (e.g., from a coiled pipe reactor). Other heat transfer mechanisms can also be used. Regardless of its structure, cooled exhaust gases are ultimately emitted from the heat transfer mechanism of reactor 40 at exhaust outlet 44. Electric port 58 is connected to electrical power line 60, which can carry current to a storage device or electrical grid, or power electrical equipment capable of operating on an AC power supply.

The operation of system 10 involves feeding reactor 40 with reactants from alcohol storage tank 28 and oil storage tank 12. This is carried out through connectors 30, 14, and 38. As used herein, "connectors" of the systems of the present invention are constructed of any material suitable for transfer of materials, solid, liquid, or gas. On an industrial scale, the connectors are constructed of metal and/or plastic or rubber material. As material passing through connectors of system 10 may need to be heated or cooled, the connectors are preferably constructed of a material that can withstand heat and cold. Also, it may be desirable for the connectors (or portions thereof) to be insulated. The size of individual connectors may vary according to the overall size of the system or the particular use of the connector.

Suitable reactants in system 10 include alcohol and oil as described above. Alcohol storage tank 28 and oil storage tank 12 are preferably constructed of a durable industrial grade material known in the art to be suitable for storage of alcohols and oils. The size of the storage tanks depends upon the overall size and scale of system 10. If it is undesirable for any reason to store the oil and alcohol reactants in a storage tank device, alcohol and oil may be supplied to system 10 in any other convenient or suitable means.

Movement of alcohol from alcohol storage tank 28 into reactor 40 is facilitated by alcohol feed pump 32, and movement of oil from oil storage tank 12 into reactor 40 is facilitated by oil feed pump 16. Where connectors 30 and 14 junction with connector 38, the oil and alcohol mix prior to the introduction into reactor 40.

It may be desirable for the oil and alcohol reactants to be heated before entering reactor 40. Accordingly, connector 30 is equipped with preheater 36 and connector 14 is equipped with preheater 20. Preheaters 20 and 36 are preferably equipped with several modes or elements for heating. For example, upon starting the system, resistive heating elements can afford sufficient heating of the alcohol and oil prior to their introduction into reactor 40. However, preheaters 36 and 20 are preferably equipped with heat exchange devices which gain heat from the hot biofuel product output from reactor 40 (described in more detail below). According to this embodiment, heated products from reactor 40 pass through outlet 46, and via connectors 48, 48a into preheaters 36 and 20. This can be achieved upon start-up by running the power supply 50 (i.e., on a reservoir of biofuel) until sufficient heat has been generated to reach supercritical temperatures and pressure. Other methods of preheating the reactants may also be employed.

Reactor 40 of system 10 (and the reactors of the other systems of the present invention) is constructed in a manner that affords suitable mixing of the oil with the alcohol under conditions effective to transesterify the oil, thereby producing a biofuel product. Triglyceride transesterification processes, and reactors suitable for carrying out these reactions, are known in the art. Exemplary types of reactors include without limitation, shell-and-tube reactors and coiled-pipe reactors, both of which are well known in the chemical industry. Transesterification products include a mixture of fatty acid methyl/ethyl esters, derived from plant/animal triglycerides through transesterification with an alcohol. Typically, these conditions may involve a temperature of about 300° C. to about 420° C., or a temperature of between about 380° C. to about 410° C., or at a temperature of about 400° C. The pressure may be about 95 bar and about 300 bar, or between about 95 bar and 125 bar, or about 100 bar.

The product of reactor 40 is a biofuel product (i.e., a mixture of fatty acid methyl/ethyl esters or FAME). The produced biofuel may be stored in storage tank 26, consumed by power source 50, or both.

Under optimal conditions, the biofuel product is substantially free of glycerol, i.e., contains less than 1%, more preferably less than 0.5%, most preferably less than 0.1% glycerol. This allows the biofuel product to be consumed without the need for further purification/separation to remove glycerol.

In addition, the biofuel product does not contain significant residual alcohol that would otherwise need to be removed (i.e., by separation of the biofuel product from alcohol).

This is a Problem

The biofuel may also contain small amounts (less than 2%, more preferably less than 1%) of decomposition by-products generated by the transesterification of the seed oil at high temperatures. Most of these byproducts can be included in the fuel with positive effects on fuel viscosity, cloud and pour points. For example, biofuels that remain in solution phase at temperatures as low as 5° C. have been obtained.

If unwanted byproducts are generated under particular conditions, it may be desirable to have a separator positioned downstream of reactor outlet 46, whereby the separator is capable of separating the biofuel product from the unwanted decomposition byproducts. Suitable separators may include, without limitation, one or more distillation columns.

As described above, the biofuel product of reactor 40, or a portion thereof, may move through connector 48 into (or near) preheaters 36 and 20, and then to storage tank 26 (and, if desired, to power source 50 via connector 68). The biofuel product may also move directly from reactor 40 into power source 50 via connector 48 and through intake port 66 of power source 50. In one embodiment of this and other methods of the present invention, power source 50 utilizes a first portion of the biofuel product of reactor 40 as its biofuel energy source and storage tank 26 receives a second portion of the biofuel product. According to this embodiment, the first portion is about 2-15 mol percent of the total biofuel product and the second portion is about 85-98 mol percent of the total biofuel product.

Valves 64 and 62 may be used to control the amount of biofuel product transferred in either of these manners. Also, as illustrated in FIG. 1, valve 24 can be used to control the flow of material from connector 48 to storage tank 26. While specific valves (e.g., valves 64, 62, and 24) are illustrated in the systems of the present invention, valves may be inserted (or removed) at various other locations in the systems to control flow or movement of materials throughout the systems, as desired. The use of valves to control the movement of liquid through connecting pathways (e.g., pipes or hoses) is commonly known.

Power source 50 is connected to reactor 40 and the biofuel product of reactor 40 provides the energy needed for power source 50 to operate. Operation of power source 50 is carried out in a way that power source 50 produces a hot exhaust gas, as illustrated in FIG. 1. The hot exhaust gas is transferred from power source 50 through exhaust manifold 52 and connects to the heat transfer mechanism on reactor 40, which allows heat transfer from the hot exhaust gas to reactor 40. The hot exhaust gas from power source 50 is used to help drive the transesterification reactions occurring in reactor 40. In one embodiment, the hot exhaust gas produced by power source 50 is sufficient to drive the transesterification reactions occurring in reactor 40.

In addition to producing a hot exhaust gas, power source 50 has outlet 58, which is connected to electrical power line 60. Accordingly, power source 50 has the ability to function as a generator, converting mechanical energy into electrical energy. It may be desirable as part of system 10, or any other system of the present invention, to have an electrical power storage device (e.g., battery, capacitor, or electrical grid) connected to electrical power line 60, whereby electrical power generated from power source 50 is transferred via power line 60 to the storage device.

Exemplary power sources 50 include, without limitation, a diesel engine or a thermal heater. In a preferred embodiment, power source 50 is a diesel biofuel engine. Accordingly, another aspect of the present invention is directed to a biodiesel engine system, which includes a biodiesel engine as the power source. The biodiesel engine can be provided in any type of transport vehicle, including a passenger automobile or a heavy-duty off-road vehicle or construction equipment.

Using the biodiesel engine as an example, to start the system an amount of the biofuel feedstock is pumped by the injection pump of the engine to the common rail and then injected in the combustion chambers of the engine in a conventional way. When the reactor is heated by the exhaust gas of the engine to the desired temperature, pumping of the alcohol and oil is initiated and new biofuel is produced for the subsequent combustion in the power source/diesel engine and/or for storage.

The systems of the present invention can be portable or stationary. For example, portable systems can be used as generators of biodiesel fuel for a biodiesel transportation vehicle and/or off road heavy duty equipment, as well as generators of electrical energy. When used as a portable system in a transportation vehicle and/or heavy duty equipment machinery, the system is calibrated towards providing power to the engine and, preferably, the engine will consume most or all of the fuel produced by the system. According to this embodiment, reactor 40 of system 10 is in communication with power source 50, i.e., a diesel engine, via connector 48a to deliver biofuel to the common rail of the diesel engine. Thus, in this embodiment, power source 50 produces power (and heat) to operate the transportation vehicle and/or heavy duty equipment machinery.

To benefit from the advantages of supercritical processes, an integrated two-step supercritical technology was designed to produce both vegetable oils by extraction with supercritical $CO_2$ and then biodiesel through transesterification of the oils from the extraction step with a supercritical alcohol in a continuous tubular reactor.

Figure 2:
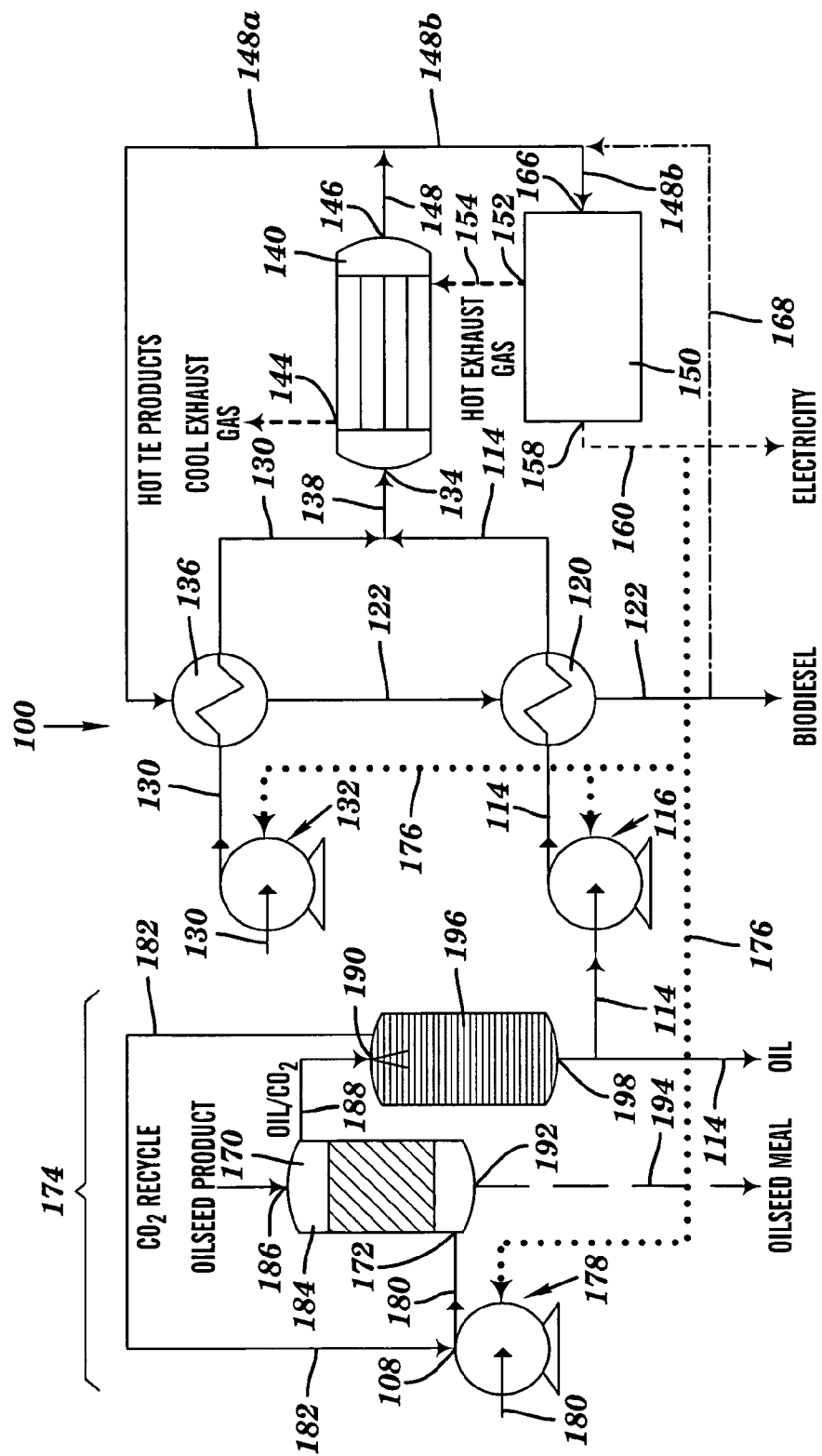
FIG. 2 is a schematic illustration of one embodiment of an integrated multistage supercritical technology system of the present invention to extract vegetable oil, convert the extracted oil to biofuel, as well as to harness electrical power.

Accordingly, a further aspect of the present invention is directed to system 100, as illustrated in FIG. 2, which includes an extractor 184, reactor 140, and power source 150. System 100 of FIG. 2 is much like system 10 of FIG. 1, except that system 100 involves subsystem 174 for processing a source of oilseed product to produce the oil reactant. As described in greater detail below, subsystem 174 involves the use of supercritical $CO_2$.

Reactor 140 is in communication with oil storage tank 112 via connector 138 and connector 114. Reactor 140 is also in communication with alcohol storage tank 128 via connector 138 and connector 130. Connector 138 joins connectors 130 and 114, and allows for mixing of oil and alcohol prior to their introduction to reactor 140 via intake port 134. Connector 130 includes feed pump 132 and preheater 136. Connector 114 includes feed pump 116 and preheater 120.

The transesterified oil, now a biofuel product, is removed from reactor 140 via outlet 146 and connector 148. Connector 148 splits to form a first branch 148a and a second branch 148b. The first branch 148a connects via valve 64 with preheaters 136 and 120, and ultimately storage tank (or collection reservoir) 126. There is also a valve 124 in the first branch 148a, located between preheater 120 and storage tank 126. Preheaters 136 and 120 allow for heat exchange to occur between the hot transesterified biofuel product and the oil and alcohol being fed into reactor 140. The second branch 148b connects via valve 162 with power source 150 to deliver biofuel to the power source.

Power source 150 includes intake port 166, exhaust manifold 152, and electrical port 158. The heat transfer mechanism 154 is connected to the reactor 140, which allows heat transfer from the hot exhaust gas to the reactor in a manner described above. Cooled exhaust gases are emitted from the heat transfer mechanism of reactor 140 at exhaust outlet 144. Electric port 158 is connected to electrical power line 160, which can carry current to a storage device or electrical grid, or power electrical equipment capable of operating on an AC power supply.

In subsystem 174, extractor 184 has intake port 186 through which oilseed product is introduced, $CO_2$ intake port 172, and exit ports 170 and 192. Exit port 192 is connected to transport line 194 for removal of spent oilseed meal. Exit port 170 is connected to connector 188, which connects extractor 184 to flash tank 196.

Flash tank 196 has intake port 190, which receives the oil/$CO_2$ mixture via connector 188. Flash tank 196 also has outtake port 198, which connects to oil transport line 114. Flash tank 196 is connected to oil feed pump 116 via oil transport line 114. Oil transport line 114 also connects flash tank 196 to an oil collection site, which is either in proximity to or separate from system 100. Oil transport line 114 includes oil feed pump 116 and preheater 120.

Electrical power line 176 connects electrical power line 160 to $CO_2$ pump 178, alcohol feed pump 132 and oil feed pump 116. $CO_2$ pump 178 is connected to extractor 184 via connector 180 through intake port 172. $CO_2$ pump 178 also has intake port 108, which is connected to connector 182, connecting $CO_2$ pump 178 to flash tank 196.

System 100 operates much like system 10 of FIG. 1, except that the oil reactant is produced in the extraction reaction of subsystem 174. Basically, subsystem 174 operates to produce vegetable oils by extraction with supercritical $CO_2$ by contacting the oilseed product with supercritical $CO_2$ under conditions effective to extract the oil from the oilseed product, which can then be recovered.

In operation, extractor 184, which is a processor that converts an oilseed product, is loaded with an oilseed product (e.g., whole or ground soybeans) at intake port 186. Also entering extractor 184 is $CO_2$ from connector 180, which is pumped from a source of $CO_2$ by $CO_2$ pump 178. Power to operate $CO_2$ pump 178 may come from power source 150, via electrical power lines 160 and 176. Also, power source 150 can provide the power to operate alcohol feed pump 132 and oil feed pump 116, via electrical power line 176. Electrical power derived from power source 150 can also be used to run or operate other features or components of the systems of the present invention.

Extraction of oil from an oilseed product in the presence of supercritical $CO_2$ is preferably carried out in an extractor under conditions which include a temperature between about 80° C. and the roasting temperature of the oilseed product, and a pressure of at least about 100 bar. Preferred conditions include a temperature of between about 100° C. and about 120° C., and a pressure of at least 100 bar, or a pressure of between about 350 and about 500 bar.

The $CO_2$ provided to subsystem 174 may be in the form of liquid $CO_2$. It may be desirable for the $CO_2$ provided to subsystem 174 to be combined with a cosolvent, such as propane or butane prior to entering extractor 184. When employed, the cosolvent may constitute up to about 10 mol % of the $CO_2$-cosolvent mixture. Also, it may be desirable to heat the $CO_2$ sufficient to render the CO2 supercritical prior to its introduction into extractor 184. This may require the addition of a heat transfer mechanism, as described supra. Accordingly, a heat transfer mechanism may be employed to transport exhaust from power source 150 to reactor 140 (as described in system 10 of FIG. 1) and to extractor 184. Also, $CO_2$ is recycled from flash tank 196 and is drawn through connector 182 through port 108 of $CO_2$ pump 178. After extraction in extractor 184, the non-oil byproduct (e.g., soybean meal) exits extractor 184 at port 192 through transport line 194.

The oil/$CO_2$ product from extractor 184 is transferred to flash tank 196 via connector 188 and enters flash tank 196 at intake port 190. Flash tank 196 operates to separate the oil from the $CO_2$. The separated $CO_2$ leaves flash tank 196 via connector 182, and the separated oil leaves flash tank 196 via outtake port 198, which connects to connector 114 and either delivers oil to reactor 140 or to an optional storage tank or collection device.

Power source 150 can be any of the power sources identified for power source 50 above.

As noted above, the biofuel products and transesterified seed oil made according to the methods of the present invention may be further refined. However, as by the examples below, further refining is not necessary in view of the favorable properties of the raw biofuel product obtained in accordance with the present invention.

EXAMPLES

The following examples are intended to illustrate the invention, and are not intended to limit its scope.

Example 1 Transesterification of Vegetable Oils

A laboratory apparatus (FIG. 3) was assembled for transesterification of vegetable oil. As shown in FIG. 3, the apparatus includes three syringe pumps (Teledyne Isco) for oil, alcohol, and $CO_2$ delivery; tubular reactors (coiled Hastelloy pipes of 2 and 4 m in length and 1.5 mm I.D.) heated in an electrical furnace; a view cell (designed and constructed at Syracuse University) to monitor phase transitions, heated at reactor temperature by four heating cartridges inserted in its 316-SS block; and a separator for liquid and gaseous transesterification product separation. Any of the reactor feeding streams can be preheated to the desired temperatures by using electrical heating tapes wrapped around feeding pipes which are similar with those of the reactor.

Experiments with tubular reactors (Table 2) have been executed to select ranges of pressure/temperature conditions, feedstock composition and residence time under which the highest yield of biodiesel is obtained without requiring further separation/purification steps.

TABLE 2

Laboratory Experiments on Transesterification Reactions

| Run # | System | $FR_{oil}$[a] (mL/min) | $FR_{ROH}$[a] (mL/min) | ROH:Oil (molar) | T (° C.) | P (bar) | τ (s) | Comments on transesterification products* |
|---|---|---|---|---|---|---|---|---|
| 1 | SBO-MeOH | 4 | 1 | 6 | 350 | 200 | 61 | 2 phases; emulsive |
| 2 | SBO-MeOH | 4 | 1 | 6 | 400 | 200 | 52 | 2 phases; emulsive |
| 3 | SBO-MeOH[b] | 2 | 0.5 | 6 | 350 | 200 | 121 | 2 phases; emulsive |
| 4 | SBO-MeOH[b] | 2 | 0.5 | 6 | 400 | 200 | 105 | one phase; clear |
| 5 | SBO-EtOH | 2 | 0.5 | 6 | 400 | 200 | 105 | one phase; clear |
| 6 | SBO-EtOH | 2 | 0.4 | 5 | 400 | 200 | 109 | one phase; clear |
| 7 | SBO-EtOH | 2 | 0.4 | 5 | 400 | 100 | 90 | 2 phase; emulsive |
| 8 | SBO-EtOH[b,c] | 2 | 0.4 | 5 | 400 | 100 | 89 | one phase; clear |
| 9 | SBO-EtOH[b,c] | 2 | 0.4 | 5 | 375 | 100 | 94 | one phase; clear |
| 10 | SBO-EtOH[c] | 2 | 0.4 | 5 | 400 | 300 | 131 | one phase; clear |
| 11 | SBO-EtOH[c] | 2 | 0.4 | 5 | 425 | 300 | 124 | one phase; brown |
| 12 | SBO-EtOH[c] | 2 | 0.4 | 5 | 375 | 300 | 180 | one phase; clear |
| 13 | SFO-EtOH[c] | 2 | 0.4 | 5 | 375 | 100 | 94 | one phase; clear |
| 14 | SFO-EtOH[c] | 2 | 0.4 | 5 | 400 | 200 | 119 | one phase; clear |
| 15 | SFO-EtOH[c] | 2 | 0.4 | 5 | 425 | 300 | 124 | one phase; yellow |
| 16 | SFO-EtOH | 2 | 0.4 | 5 | 350 | 100 | 129 | 2 phases; emulsive |
| 17 | SBO-MeOH[c] | 2.22 | 0.28 | 3 | 400 | 100 | 127 | one phase; clear |
| 18 | SBO-MeOH[c] | 2 | 0.5 | 6 | 400 | 100 | 72 | one phase; clear |
| 19 | SBO-MeOH[c] | 1.82 | 0.68 | 9 | 425 | 100 | 54 | one phase; clear |
| 20 | SBO-MeOH[c] | 1.67 | 0.83 | 12 | 425 | 100 | 45 | 2 phases; emulsive |
| 21 | SBO-MeOH[c] | 1.5 | 1 | 16 | 425 | 100 | 44 | 2 phases; emulsive |
| 22 | SBO-MeOH[c] | 0.8 | 0.1 | 3 | 325 | 125 | 159 | 2-3 phases; emulsive |
| 23 | SBO-MeOH[c] | 0.8 | 0.1 | 3 | 350 | 125 | 156 | one phase; clear |
| 24 | SBO-MeOH[c] | 0.8 | 0.1 | 3 | 375 | 150 | 153 | one phase; clear |
| 25 | SBO-MeOH[c] | 0.8 | 0.1 | 3 | 400 | 250 | 150 | one phase; clear |
| 26 | SBO-MeOH[c] | 0.7 | 0.1 | 3 | 300 | 250 | 133 | 2 phases; emulsive |
| 27 | SBO-MeOH[c] | 0.1 | 0.1 | 24 | 250 | 250 | 491 | 2 phases; emulsive |
| 28 | SBO-MeOH[c] | 0.1 | 0.1 | 24 | 300 | 150 | 421 | 2 phases; emulsive |
| 29 | SBO-MeOH | batch, 3 mL each | | 23 | 26–420 | 1–117 | 3600 | phase transitions observed |
| 30 | SBO-EtOH | batch, 0.5 mL each | | 16 | | | | |
| 31 | SBO only | 0.1 | 0 | 0 | 27–410 | 100 | 3600 | coking at T > 400° C. |

[a] flow rates at room temperature and system pressure;
[b] 4 mol % $CO_2$ in alcohol;
[c] both oil and alcohol feeding streams were preheated at 350° C.;
*one phase means near complete (>98%) triglycerides conversion.
ROH = MeOH or EtOH; SBO = soybean oil; SFO = safflower oil.

The Hastelloy walls of these reactors, with high Ni content, should have a catalytic effect on transesterification yield and reaction product composition. To further pursue this assumption, transesterification experiments will also be conducted in quartz reactors similar with those reported by Resende et al. (Energy & Fuels 21:3637-3643 (2007), which is hereby incorporated by reference in its entirety) for biomass non-catalytic supercritical gasification.

Using high pressure view cells with sapphire windows sealed on copper/gold gaskets with Belleville washers and a high-speed photo system (Photron; up to 2000 frames/s) as a diagnostic aid, it was found that the oil miscibility with methanol is crucial to attaining a high conversion of triglycerides to the FAME in short residence time. Experiments have been carried out with this apparatus to test its capabilities regarding SBO/SFO-methanol/ethanol miscibility and phase transitions under different P-T values (Table 2), both under continuous flow and batch modes.

The objective of the batch experiments was to study triglyceride-alcohol mixing phenomena and phase transitions during a heating process regardless of the reaction time and transesterification conditions for optimum biodiesel production in continuous flow reactors. For these experiments, the reactants without cosolvent were initially filled in the view cell in the amounts shown in Table 2 (runs #29-30), sealed and then slowly heated to obtain supercritical homogeneous phases.

Experimental Conditions:

Different oil-alcohol compositions have been experimentally studied (Table 2, columns 2-5). SBO and SFO have been used as the triglyceride source and both methanol and ethanol were the alcohols of choice. As shown in this table, small amounts of liquid CO2 (up to 4 mol % in the alcohol) have been pumped into the reactor for some of the experiments to increase oil-alcohol mixing and their mutual miscibility as well as to lower the critical temperature of the mixture.

Experimental P-T values (Table 2, columns 6-7) have been automatically recorded by using a HEISE digital pressure indicator and K-type thermocouples, respectively, and software available from National Instruments. A set of typically recorded conditions are shown in FIG. 4.

The residence time τ (s) was calculated based on the reactor volume V (cm3), the total volumetric flow-rate v (mL/min) and the fluid density (g/mL) at pump (ρ0) and in the reactor (ρ):

τ=60V/(vρ0/ρ.

The densities have been obtained from CHEMCAD simulations (process simulation software from Chemstations, version 5.6.4 (Chemcad version 5.6.4 CHEMSTATIONS Inc. Houston, Tex., 2007) by using the Soave-Redlich-Kwong ("SRK") equation of state ("EOS"). The calculated values have been checked with the observed residence times during the experiments and a reasonable agreement was found (Table 2, column 8).

Analytical Method:

The concentration of oil components as well as the transesterification reaction products were analyzed by a Thermo Electron gas chromatograph ("GC") equipped with a splitless injector, an MS detector ("MSD"), and an ultra performance capillary column from Agilent, Inc. (MS 1, cross-linked 5% Ph-Me silicone, 30 m×0.20 mm I.D., 0.33 µm film thickness). Before GC analyses, small portions of the transesterification products were dissolved in liquid hexane without being subjected to any separation/purification methods. Standard solutions of the main FAME components of the biodiesel samples were also prepared and used to confirm the identity of the transesterification products and to quantify their amounts.

Results and Discussion:

Both continuous flow and batch experiments have been executed at conditions shown in Table 2. Three different oil-alcohol systems were studied: SBO-methanol, SBO-ethanol, and SFO-ethanol. For the continuous flow experiments, the residence time varied from about one minute to eight minutes while for the batch mode the total heating time was about one hour to slowly heat the reactants from room temperature to supercritical states.

The solubility of the oil in supercritical alcohol phase is a keystone for rapid and complete transesterification reactions. Solubility depends on P-T compositions conditions, but if the oil and alcohol are both in a single supercritical phase (i.e., totally miscible), then the transesterification is fast and near complete. Liquid-vapor-supercritical phase transitions for the binary/ternary systems studied have been monitored with a view cell attached at the outlet of the reactor. Selected images of the involved phenomena associated with a continuous tubular reactor are shown in FIG. 5. Transitions of interest were those from liquid-vapor/supercritical heterogeneous mixtures to homogeneous supercritical phases. Additionally, equal volumes of SBO and methanol have been heated in a view cell in a batch mode. Selected photographs of these phase transitions associated with transesterification reactions between SBO and methanol (1:24 molar ratio) heated from ambient conditions to 420° C. and 120 bar are shown in FIG. 6. In this case, SBO, methanol, and reaction products are only partially miscible up to near 350° C., while beyond 350° C. and 100 bar, one homogeneous phase has been obtained. Further, SBO and ethanol were also heated in a view cell from room P-T to supercritical phases (FIG. 7). These images show different fluid phase patterns from quasi-total oil-alcohol immiscibility at ambient conditions to homogeneous supercritical phases.

The supercritical transesterification global reaction, used for the process design, was considered for a generic composition of triglycerides and lumped glycerol decomposition products ("GDP"):

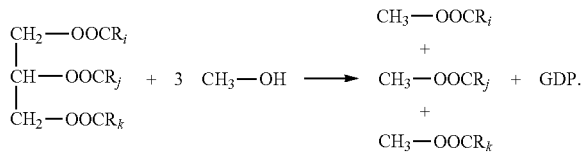

In this global reaction, Ri, Rj, and Rk are the hydrocarbon chains of the major SBO fatty acids: palmitic, oleic, linoleic, linolenic, and stearic. It is well established that the steps of these transesterification reactions include triglyceride conversion to diglycerides, then to monoglycerides, and finally to FAME and glycerol (Diasakou et al., Fuel 77:1297-1302 (1998), which is hereby incorporated by reference in its entirety). The transesterification reaction products obtained at the conditions outlined in Table 2 have been analyzed by a GC-MS method and also qualitatively assessed as shown in the last column of this table. In the cases where a clear, non emulsive phase was observed, there were no immiscible components (e.g., oil, glycerol, and alcohol) in the reaction products and the reactant conversion was near complete (>98%). The GC-MSD chromatograms of FIGS. 8A, 8C, and 8D showed negligible amounts of monoglyceride and diglyceride intermediate transesterification byproducts when compared to a commercial sample (FIG. 8B). Although the GDPs were not analyzed in this study, it was estimated that individual byproducts were either in negligible amounts to be captured by GC-MSD or their retention times were positioned in the delay time period of solvent venting.

FIGS. 8A and 8C are selected chromatograms which show the differences among the reaction products when different alcohols were used in the transesterification process (e.g., methanol and ethanol, respectively). Small FAME peaks shown in the FIG. 8C were from intentionally contaminated samples for purpose of comparison with those of the ethyl esters when a shift toward the right for the latter was obtained. A comparison between the transesterification products when different oils were used (e.g., SBO and SFO) is shown in FIGS. 8A and 8D. The level of the saturated esters is lower for the SFO products (peaks at 54.0 and 61.0 minutes in FIG. 8D). Also, a comparison between typical transesterification products obtained with supercritical methanol and those in a commercial biodiesel sample is shown in FIGS. 8A and 8B. The lower level of the saturated esters in the samples (peaks at 51.4/51.6 and 58.7/58.8 min in FIGS. 8A, 8B and 8C) and more byproducts in the commercial sample (peaks at 62-72 min in FIG. 8B). From these figures it is apparent that the experimental biodiesel samples, without any separation, contained less impurities compared to the commercial biodiesel.

The experiments carried out have shown that nearly complete triglyceride conversions to FAME have been achieved for stoichiometric reactants or slightly excess of alcohol (alcohol:triglyceride molar ratio of about 3-5:1) preheated at 350° C. and then reacted at 350-400° C. and 100-300 bar for 1.6-3.0 minutes without cosolvent (Table 2, runs 10, 12-14, 17, 23-25). The effects on conversion of these supercritical transesterification conditions are in agreement with studies using pulsed neutron diffraction with isotope substitution which showed that in the low-density supercritical methanol (i.e., high-temperature and relatively low-pressure conditions) the large molecular clusters are broken to generate monomers or small oligomers (Yamaguchi et al., J. Chem. Phys. 112:8976-8987 (2000), which is hereby incorporated by reference in its entirety). These species are readily accessible for transesterification reactions with the triglycerides in the oil compared to clusters of the H-bonded alcohol. In these particular supercritical states, in contrast to the biodiesel production at conventional conditions (~1 atm, 60-80° C., with acid/base catalysts), the reaction rate is about two orders of magnitude faster, biodiesel components are formed using near stoichiometric quantities of alcohol, and negligible glycerol is left in the final reaction products. Instead, a number of other compounds are formed resulting from the breakdown of the glycerol. A catalytic effect of the reactor walls on this transesterification performance cannot be, however, excluded.

The conditions at which glycerol decomposed in the reaction system without adversely affecting the FAME compositions have been determined as 350-400° C. and 100-300 bar. The decomposition of glycerol at the temperatures of these experiments has also been reported elsewhere (Iijima et al., ASAE/CSAE Annual International Meeting, Ottawa, Ontario, Canada, Aug. 1-4, 2004, Paper No. 046073, which is hereby incorporated by reference in its entirety). A near complete decomposition of glycerol in the experiments occurred under mentioned transesterification conditions and was based on mass balance evaluations which indicated that the transesterification products are obtained in the same amount with the mass of the reactants and only traces of glycerol were present in the final product for the experiments with near complete conversion.

The experiments shown in Table 2 and the reported data in Table 1 demonstrate that the temperature effect on triglyceride conversion dwarfs that of the pressure for supercritical transesterification reactions and shortens the residence time to very attractive ranges for commercial applications. Higher pressures increase the overall density of the reactants but also increase the H-bonded clusters of alcohol molecules as discussed above. These competitive effects render the pressure influence on FAME yield rather minor when transesterification reactions are carried out at supercritical pressures. At these conditions, an inert cosolvent (e.g., CO2) used to enhance oil-alcohol miscibility and solubility may also act as a diluent to slow down the FAME thermal decomposition. The cosolvent, however, also may slow transesterification rates. As shown above, cosolvents should be used to adjust the critical point and phase behavior of the reactive mixture triglyceride-alcohol, so that the transesterification can take place in the convenient supercritical regions where the FAME yield can be tuned effectively by pressure and temperature.

Although not all of the GDPs have yet been identified, it is expected that they can be directly used as part of the biodiesel fuel. This situation would simplify the biodiesel production process greatly since the glycerol no longer has to be separated from the biodiesel product and additional fuel could be produced. Further, the presence of small molecular components in biodiesel could positively affect the viscosity and the cloud/pour point of the fuel. For example, at 5° C., commercial samples of biodiesel are solids while those of the present invention are still in the liquid state. In addition, because the alcohol can be used only in slight excess of the stoichiometric amounts, essentially all of the alcohol reacts, eliminating the need for its separation and recycling at significant parasitic pumping cost.

The main difference between the transesterification conditions described herein and those reported in the literature (Table 1) for near complete triglyceride conversions originates from triglyceride-alcohol miscibility. At similar P-T conditions, this property is strongly dependent on triglyceride composition and alcohol to triglyceride ratio. Although it is generally believed that a supercritical alcohol leads to near complete triglyceride conversions, under stoichiometric or slightly higher alcohol to triglyceride ratios, the reactant system is still biphasic, usually up to 350° C., with bulk triglycerides in a separate liquid phase. Large excess of alcohol is required to bring the system to supercritical states at the lower temperatures employed in the cited work. The transesterification reactions occur in the supercritical alcohol involving only the dissolved amount of triglycerides in this phase. Further, if glycerol does not decompose, some of the alcohol is dissolved in this phase, being unavailable for triglycerides. On the other hand, if each of the two reactant streams is preheated and the transesterification occurs in a single homogeneous supercritical phase, excess alcohol is not needed at the higher transesterification temperatures used. Another possibility is that, concurrently, the reaction is catalytically activated by the reactor metal walls.

TE reactions between vegetable oils (e.g., SBO and SFO) and alcohols (e.g., methanol and ethanol) have been conducted in both tubular and batch laboratory-scale reactors at temperatures up to 425° C., pressures up to 300 bar and ratios of alcohol to oil from stoichiometric (i.e., 3:1) to 24:1 values.

Under selected ranges of these conditions (e.g., 350-400° C., 100 bar, and alcohol to oil ratios slightly higher than stoichiometric value of 3:1) near complete conversions of oil to biodiesel products have been achieved and basically all of the glycerol produced has been decomposed to smaller molecular compounds blended within biodiesel fuel. Upon cooling the transesterification products generated under the above conditions, one homogeneous liquid phase has been obtained with viscosity, cloud/pour point, and composition superior to commercial biodiesel fuel.

Experimental data showed that the miscibility of oil-alcohol, monitored in this study through a view cell attached at the reactor outlet, plays a key role in the efficiency of the process.

An economic analysis based on a transesterification process to produce biodiesel in one step under the above conditions has been performed. It was found that the processing cost of the proposed technology could be near half of that of the actual conventional methods (i.e., $0.26/gal vs. $0.51/gal) (Collins, K. Statement of Keith Collins, chief economist, U.S. Department of Agriculture Before the U.S. Senate Committee on Appropriations Subcommittee on Agriculture, Rural Development, and Related Agencies. Aug. 26, 2006; Gerpen, Oilseeds and Biodiesel Workshop; Great Falls, Mont., Feb. 15, 2007, which are hereby incorporated by reference in their entirety). Associated with some other incentives along with higher diesel fuel prices, this new cost-saving technology is likely to make biodiesel production profitable.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A system comprising:
a source of an oilseed product that comprises a storage vessel containing the oilseed product or a processor that converts an oilseed into the oilseed product;
a source of supercritical carbon dioxide;
a source of alcohol;
an extractor in communication with the source of an oilseed product and the source of supercritical carbon dioxide, the extractor being constructed in a manner that affords suitable mixing of the oilseed product and the supercritical carbon dioxide under conditions effective to extract seed oil from the oilseed product, wherein the extractor has an exit port;
a reactor in communication with the exit port of the extractor and the source of alcohol, the reactor being constructed in a manner that affords suitable mixing of the seed oil with the alcohol under conditions effective to transesterify the seed oil, thereby producing a biofuel product, the reactor having an outlet;
a power source that operates on a biofuel energy source to produce heat, wherein the power source is in communication with the outlet of the reactor to utilize a first portion of the biofuel product as its biofuel energy source and wherein the power source is selected from group consisting of an engine, a generator that also converts mechanical power into electrical power, and a direct-fired heater;
wherein the system further includes at least one of (i) a heat transfer mechanism that transfers heat from the power source to the extractor, the reactor, or both the extractor and the reactor, and (ii) a collection reservoir that receives a second portion of the biofuel product.

2. The system according to claim 1, wherein the system comprises the heat transfer mechanism that transfers heat from the power source to the extractor, the reactor, or both the extractor and the reactor.

3. The system according to claim 2, wherein the heat transfer mechanism transfers heat from the power source to both the extractor and the reactor.

4. The system according to claim 1, wherein the first portion is about 2-15 mol percent of the total biofuel product and the second portion is about 85-98 mol percent of the total biofuel product.

5. A system comprising:
a source of an oilseed product;
a source of supercritical carbon dioxide including a source of liquid carbon dioxide, a pumping mechanism that transfers carbon dioxide from its source to the extractor, and a heat transfer mechanism;
a source of alcohol;
an extractor in communication with the source of an oilseed product and the source of supercritical carbon dioxide, the extractor being constructed in a manner that affords suitable mixing of the oilseed product and the supercritical carbon dioxide under conditions effective to extract seed oil from the oilseed product, wherein the extractor has an exit port;
a reactor in communication with the exit port of the extractor and the source of alcohol, the reactor being constructed in a manner that affords suitable mixing of the seed oil with the alcohol under conditions effective to transesterify the seed oil, thereby producing a biofuel product, the reactor having an outlet;
a power source that operates on a biofuel energy source to produce heat, wherein the power source is in communication with the outlet of the reactor to utilize a first portion of the biofuel product as its biofuel energy source and wherein the power source is selected from group consisting of an engine, a generator that also converts mechanical power into electrical power, and a direct-fired heater;
a heat transfer mechanism that transfers heat from the power source to the extractor, the reactor, or both the extractor and the reactor; and
a collection reservoir that receives a second portion of the biofuel product;
wherein the heat transfer mechanism transfers heat that is sufficient to render the carbon dioxide supercritical prior to its introduction into the extractor.

6. The system according to claim 5, wherein power for the pumping mechanism is generated by the power source.

7. The system according to claim 5, further comprising a source of a cosolvent, wherein the cosolvent is premixed with the supercritical carbon dioxide before introduction into the extractor.

8. A system comprising:
a source of an oilseed product;
a source of supercritical carbon dioxide;
a source of alcohol;
an extractor in communication with the source of an oilseed product and the source of supercritical carbon dioxide, the extractor being constructed in a manner that affords suitable mixing of the oilseed product and the supercritical carbon dioxide under conditions effective to extract seed oil from the oilseed product, wherein the extractor has an exit port;

a reactor in communication with the exit port of the extractor and the source of alcohol, the reactor being constructed in a manner that affords suitable mixing of the seed oil with the alcohol under conditions effective to transesterify the seed oil, thereby producing a biofuel product, the reactor having an outlet;

a power source that operates on a biofuel energy source to produce heat, wherein the power source is in communication with the outlet of the reactor to utilize a first portion of the biofuel product as its biofuel energy source and wherein the power source is selected from group consisting of an engine, a generator that also converts mechanical power into electrical power, and a direct-fired heater; and a separator positioned between the outlet of the reactor and the power source, the separator being capable of separating the biofuel product from decomposition byproducts generated by the transesterification of the seed oil;

wherein the system further includes at least one of (i) a heat transfer mechanism that transfers heat from the power source to the extractor, the reactor, or both the extractor and the reactor, and (ii) a collection reservoir that receives a second portion of the biofuel product.

\* \* \* \* \*